United States Patent Office 2,806,129
Patented Sept. 10, 1957

2,806,129

TUNGSTEN CARBIDE WELD RODS

Arthur T. Cape, Los Angeles, Calif., assignor to Coast Metals, Inc., Little Ferry, N. J., a corporation of Delaware No Drawing. Application April 24, 1956,
Serial No. 580,178

7 Claims. (Cl. 219—146)

This invention relates generally to tungsten carbide weld rods, but has reference more particularly to improvements in the composition of such rods.

It has heretofore been common practice to provide rods consisting of a steel tube filled with tungsten carbide particles of various mesh sizes and of varying sizes of mesh, with and without additions of carbon, silicon, silicon-manganese, etc.

The rods are used as welding rods, in both acetylene and arc welding, to form hard facing deposits, whose principal virtue lies in the presence of undissolved tungsten carbide.

Trouble is experienced, however, in preventing the tungsten carbide from dissolving in the steel matrix supplied by the tube upon melting. Since the dissolving of the tungsten carbide does not greatly increase the hardness of the matrix, the net result is a considerable loss of an expensive ingredient, namely, the tungsten carbide. This is especially true when arc welding is employed.

I have found, after numerous tests, that the addition to the contents of the tube, of copper, in amounts of from about 1% to about 10% of the total weight of the rod, i. e., the weight of the tube and its contents, that the dissolving of the tungsten carbide is effectively prevented, and that the welds or hard facings are much more satisfactory, from the standpoint of hardness and other qualities.

Where the rods are used in arc welding, I prefer to use about 6% of copper. A cross-section of a weld deposit, formed by such a rod, shows the presence of innumerable particles of tungsten carbide, in essentially unaltered form.

Where the rods are used in acetylene welding, I prefer to use about 2% to about 3% of copper, since such amounts produce results as satisfactory as those produced when larger amounts of copper are used.

The tube normally will contain about 60% of crushed tungsten carbide, by weight of the filled tube, and by selecting the grain size of the copper and other additions, it is possible to fill in the interstices between the particles of tungsten carbide, without changing essentially the percentage by weight of the tungsten carbide in the rod.

I have also found that small amounts of nickel-boron, up to about 3%, are effective in modifying the flow characteristics of the weld rod, and for acetylene welding, a composition consisting of 60% of tungsten carbide (20–30 mesh), 2% nickel-boron (a nickel-boron alloy containing usually 18% of boron), 3% of copper, with the weight of the steel tube constituting the remainder, is highly satisfactory. For arc welding, a rod containing about 6% of copper, with the remainder consisting of the tungsten carbide and the tube, and without other additions, is highly satisfactory. However, for both acetylene and arc welding, various deoxidizers may be used, if desired.

It will be understood that various changes may be made in the composition of the rods, without departing from the spirit of the invention or the scope of the appended claims.

Having thus described my invention, I claim:

1. A weld rod for hard facing and the like, said rod comprising a ferrous tube containing, as a filler, particles of tungsten carbide, and particles of copper, the copper constituting about 1% to about 10% by weight of the filled tube.

2. A weld rod, as recited in claim 1, in which the copper occupies the interstices between the tungsten carbide particles.

3. A weld rod, as recited in claim 1, in which nickel-boron in amounts up to about 3% by weight of the filled tube, is incorporated in the rod, as a part of the filler.

4. A weld rod, as recited in claim 1, in which deoxidizers are incorporated in the rod, as part of the filler.

5. A weld rod, as recited in claim 1, in which the copper constitutes about 6% by weight of the filled tube.

6. A weld rod, as recited in claim 1, in which the copper constitutes about 2% to about 3% of the weight of the filled tube.

7. A weld rod for hard facing and the like, said rod comprising a ferrous tube containing, as a filler, tungsten carbide particles, and particles of copper, the copper constituting about 1% to about 10% by weight of the filled tube, and the tungsten carbide about 60% by weight of the filled tube.

References Cited in the file of this patent

UNITED STATES PATENTS

| | | |
|---|---|---|
| 2,003,020 | Strobel | May 28, 1935 |
| 2,021,040 | Zublin | Nov. 12, 1935 |
| 2,137,471 | Zublin | Nov. 22, 1938 |